(12) United States Patent
McTague et al.

(10) Patent No.: US 7,190,715 B1
(45) Date of Patent: Mar. 13, 2007

(54) ASYMMETRIC DIGITAL SUBSCRIBER LOOP MODEM

(75) Inventors: Michael J. McTague, Portland, OR (US); Raman M. Srinivasan, Portland, OR (US); Brad A. Barmore, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 09/471,435

(22) Filed: Dec. 23, 1999

(51) Int. Cl.
*H04B 1/38* (2006.01)

(52) U.S. Cl. .................................. 375/222

(58) Field of Classification Search ............ 375/219, 375/222, 261, 278, 285, 298, 340, 346, 296, 375/355, 377; 370/230, 235, 286, 294, 362, 370/365, 366, 438, 467, 484, 525, 526, 536, 370/537, 542, 231, 236, 522, 527, 532, 535; 379/93.01

See application file for complete search history.

(56) References Cited

U.S. PATENT DOCUMENTS

| | | | |
|---|---|---|---|
| 4,956,871 A * | 9/1990 | Swaminathan ............... 704/229 |
| 5,038,365 A * | 8/1991 | Belloc et al. ................ 375/222 |
| 5,512,898 A * | 4/1996 | Norsworthy et al. ........ 341/155 |
| 5,737,397 A * | 4/1998 | Skinner et al. ........... 379/93.29 |
| 6,028,891 A * | 2/2000 | Ribner et al. ............... 375/222 |
| 6,112,260 A * | 8/2000 | Colterjohn et al. ........... 710/31 |
| 6,185,202 B1 * | 2/2001 | Gockler et al. ............. 370/344 |
| 6,226,296 B1 * | 5/2001 | Lindsey et al. ............. 370/401 |
| 6,263,075 B1 * | 7/2001 | Fadavi-Ardekani et al. ..... 379/399.01 |
| 6,269,103 B1 * | 7/2001 | Laturell ...................... 370/458 |
| 6,345,072 B1 * | 2/2002 | Liu et al. .................... 375/222 |
| 6,389,063 B1 * | 5/2002 | Kanekawa et al. ......... 375/222 |
| 6,400,759 B1 * | 6/2002 | Liu et al. .................... 375/222 |
| 6,404,804 B1 * | 6/2002 | Mannering et al. ......... 375/222 |
| 6,418,203 B1 * | 7/2002 | Marcie .................... 379/90.01 |
| 6,466,584 B1 * | 10/2002 | Maxwell et al. ............ 370/465 |
| 6,470,046 B1 * | 10/2002 | Scott ......................... 375/222 |
| 6,522,640 B2 * | 2/2003 | Liebenow ................... 370/338 |
| 6,529,975 B1 * | 3/2003 | Miller et al. ................. 710/64 |
| 6,535,565 B1 * | 3/2003 | Girardeau et al. ......... 375/357 |
| 6,570,912 B1 * | 5/2003 | Mirfakhraei ................ 375/222 |
| 6,594,715 B1 * | 7/2003 | Lai ............................ 710/52 |
| 6,603,807 B1 * | 8/2003 | Yukutake et al. ........... 375/222 |
| 6,707,868 B1 * | 3/2004 | Camagna et al. ........... 375/371 |

* cited by examiner

*Primary Examiner*—Khanh Tran
(74) *Attorney, Agent, or Firm*—Trop, Pruner & Hu, P.C.

(57) ABSTRACT

An asymmetric digital subscriber loop modem may achieve efficiency and cost reduction by providing a coder/decoder (codec) chip which transmits data externally of the chip when the data is at a reduced or lower data rate. That is, instead of transmitting the data at a higher data rate, which may result in increased cost, for example for EMI shielding, the codec chip transmits the data when the data is at a reduced data rate.

26 Claims, 3 Drawing Sheets

CLOCK

SYNC

DATA OUT

DATA IN

ASYMMETRIC DIGITAL SUBSCRIBER LOOP MODEM

BACKGROUND

This invention relates generally to systems for asymmetric digital subscriber loop (ADSL) communications.

Modems (short for "modulator demodulator") are used to transfer data between processor-based systems. Generally, modems may be utilized to transmit information between processor-based systems over telephone lines. A pair of modems are coupled through a transport such as a telephone network. Each modem includes a transmitter and a receiver which may be coupled by an elastic store or hybrid. In general, digital information developed by a processor-based system may be converted to analog information for transmission over the transport. Likewise, analog information received from the transport may be converted to digital information for use by the processor-based system. Thus, on each end of the transport, a modem may be provided.

A modem that is used with personal computers, as an example, may be called a remote modem because it is remote from the telephone network's central office. A modem that is provided by a telephone system is generally called a central office modem.

ADSL modems may use frequency division multiplexing (FDM) or echo cancellation (EC) to achieve full duplex operation over a subscriber loop. Discrete multi-tone (DMT) is a multi-carrier modulation technique that may achieve high bandwidth efficiency. A central office ADSL modem transmits a downstream signal to a modem at a remote terminal. The central office modem receives an upstream signal from the remote modem. The upstream and downstream signals use a common transport, typically a telephone line. The upstream signal may carry data on a lower portion of a band of frequencies. The downstream signal may carry data over an upper portion of a band of frequencies. In some embodiments, a wider bandwidth may be utilized for downstream signals than upstream signals.

Existing ADSL modems generally are implemented using two or more integrated circuits. One set of integrated circuits provides most of the digital signal processing and the other provides the analog-to-digital and digital-to-analog conversion. Generally, the two integrated circuits are separated after analog to digital conversion on the receiver side and before the digital-to-analog conversion on the transmitter side.

This means that data is transmitted between the two chips at a relatively high data rate. This high data rate transmission between integrated circuit chips results in more buffering at each chip and more pins are needed to connect the chips. This increases the cost of each chip. In addition, the high data rate also results in higher system cost due to the impact of higher frequency operation on electromagnetic interference (EMI) shielding and power control.

Thus, there is a continuing need for an ADSL modem that allows data to be more efficiently shared between integrated circuits.

SUMMARY

In accordance with one aspect, an asymmetric digital subscriber loop modem includes a integrated circuit with an analog-to-digital converter that produces data at a relatively higher data rate. A device coupled to said analog-to-digital converter, and contained in said integrated circuit, reduces the higher data rate produced by the analog-to-digital converter to a lower data rate. A multiplexer multiplexes the lower data rate data and control information and transmits the data and control information externally of the integrated circuit.

Other aspects are set forth in the accompanying detailed description and claims.

DETAILED DESCRIPTION

Figure 1:
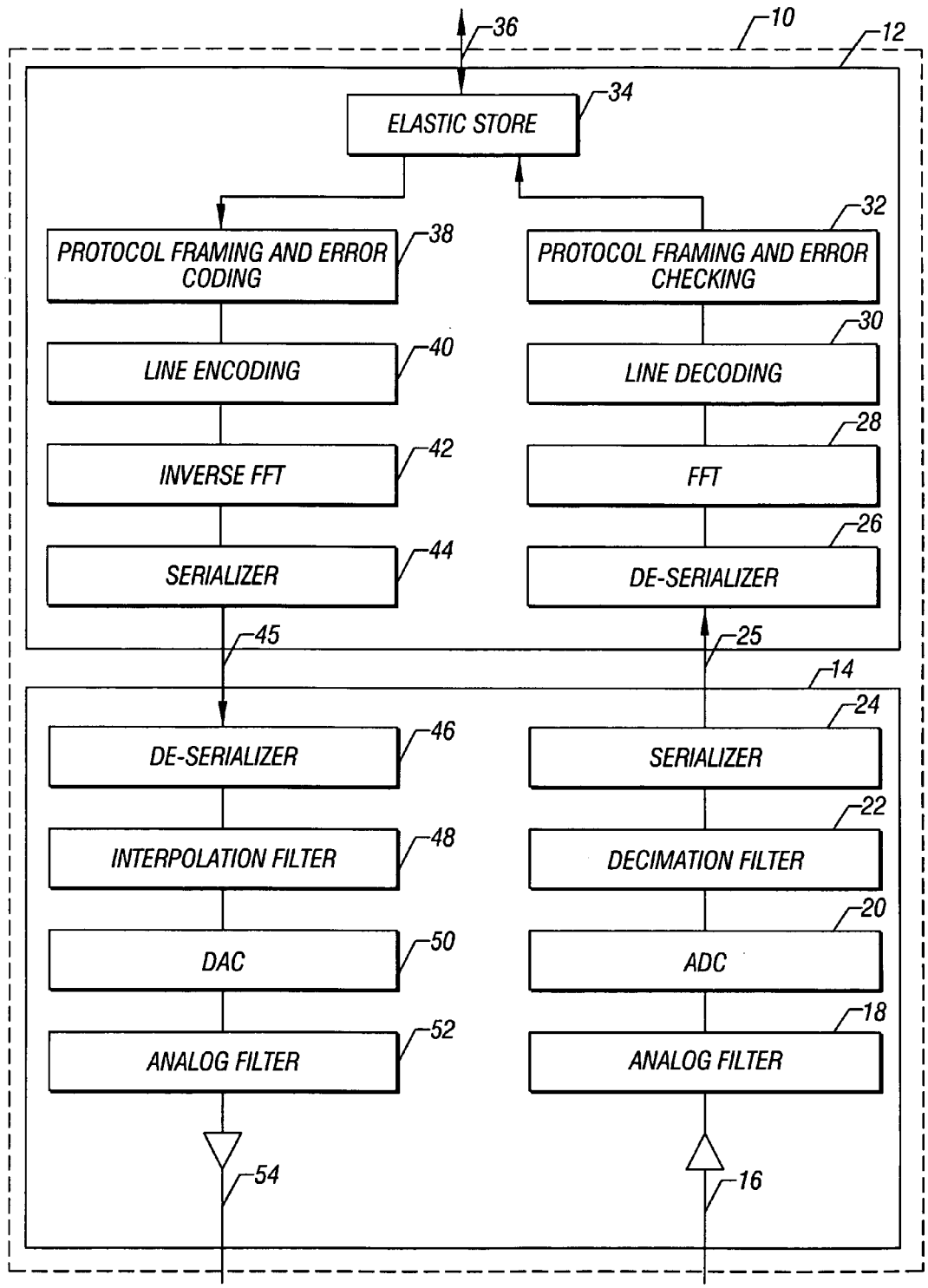
FIG. 1 is a block diagram of one embodiment of the present invention.

Referring to FIG. 1, a remote modem 10 may be an asymmetric digital subscriber loop (ADSL) modem. The modem 10, in one embodiment of the present invention, may be a so-called g.lite ADSL modem or splitterless modem which does not use a splitter at the remote location. While the present invention illustrates a remote modem, the principles set forth herein can also be utilized at the central office modem. However, because of the high number of remote modems compared to the number of central office modems, the principles set forth in the present invention are particularly applicable to the design of remote modems which are produced in relatively high volumes.

Thus, referring to FIG. 1, the downstream signal 16 from the central office (not shown) is received by the receiver section of the modem 10 and particularly by a coder/decoder (codec) chip 14 and its analog filter 18. In one embodiment of the present invention, the analog filter 18 may be a bandpass filter. The analog filter 18 may be coupled to an analog-to-digital converter 20 that converts the analog signal into a digital signal. The output of the analog-to-digital converter 20 is a relatively higher data rate signal.

A decimation filter 22 produces digital samples at a lower data rate compared to the data rate produced by the analog-to-digital converter 20. A decimation factor of the filter 22 indicates the data rate reduction from the higher data rate produced by the analog-to-digital converter 20. The decimation filter 22 may include a low pass filter and a sample rate compression device, in one embodiment of the invention.

The output signal from the decimation filter 22 may then be transmitted by a multiplexer or serializer 24 externally of the chip 14 to an ensuing digital signal processing (DSP) chip 12. The serializer 24, in one embodiment of the present invention, takes the lower data rate data produced by the decimation filter 22 and multiplexes it together with control information. The multiplexed control information and data are transmitted to a de-multiplexer or de-serializer 26 on the DSP integrated circuit chip 12 in one embodiment of the invention.

The de-serializer 26 demultiplexes the control information and data and forwards the data to a fast fourier transformer (FFT) 28 and a line decoder 30. The line decoder 30, in one embodiment of the present invention, may be a quadrature amplitude modulator (QAM) decoder. The FFT 28 and line decoder 30 demodulate the input data, separating the digital data by carrier frequency.

A protocol framing and error checking unit 32 completes the reception of the signal. The unit 32 checks for errors and places the data in a particular format for use in connection with a particular processor-based system (not shown). The decoded data stream is then passed to an elastic store or hybrid 34. A link 36 provides the information to a processor-based system (not shown).

Transmit data 54 (from the processor-based system) heading upstream goes through a transmitter section including a protocol framing and error coding unit 38 into a line encoding unit 40. The line encoding unit 40 may be a quadrature amplitude modulator (QAM) encoder, in one embodiment of the present invention. After line encoding, the information is processed by an inverse fast Fourier transformer (IFFT). The data is selectively encoded by the encoder 40 at a relatively higher data rate and the IFFT produces, for each frame, a sequence of digital samples at a relatively lower data rate.

The lower data rate output signal from the IFFT 42 is provided to a multiplexer or serializer 44 which transmits the data together with control information over a link 45 to a de-serializer 46 on the chip 14. The serializer 44 may provide a multiplexing function. The output of the de-serializer 46 is interpolated by an interpolation filter 48. The filter 48 adds interpolated data into the data stream distributed by the modem to reduce the effect of imaging by increasing the rate at which samples are produced.

Thus, the interpolation filter 48 increases the data rate of the data intended for the upstream signal 54. The interpolation filter 48 may include digital low pass filtering that enables digital suppression of the lower frequency images in the interpolation filter 48 so that the remaining images may be more easily and effectively removed by the analog filter 52. In one embodiment of the present invention, the analog filter 52 may be a low pass filter. A digital-to-analog converter 50 converts the digital signal from the interpolation filter 48 into a analog signal that is filtered by the analog filter 52.

The chips 12 and 14 communicate at lower data rates. This use of lower data rate communication may have the effect, in some embodiments of the present invention, of reducing the buffering required in each chip 12 and 14. This may reduce the cost of the overall modem 10. In addition, by reducing the data rate on the links 45 and 25, system cost may be reduced due to the impact of lower frequency operation and diminished need for EMI shielding and power control. Since the reduced data rates were used for other reasons in both the receiver and transmitter sections, no substantial additional costs are incurred.

In some embodiments of the present invention, the operation of the chip 12 may be accomplished in software implementing a soft modem. In such case, the DSP chip 12 may be eliminated. In a soft modem, a chip may be used to provide an interface between a system bus in the processor-based system and the codec chip 14.

Figure 2:
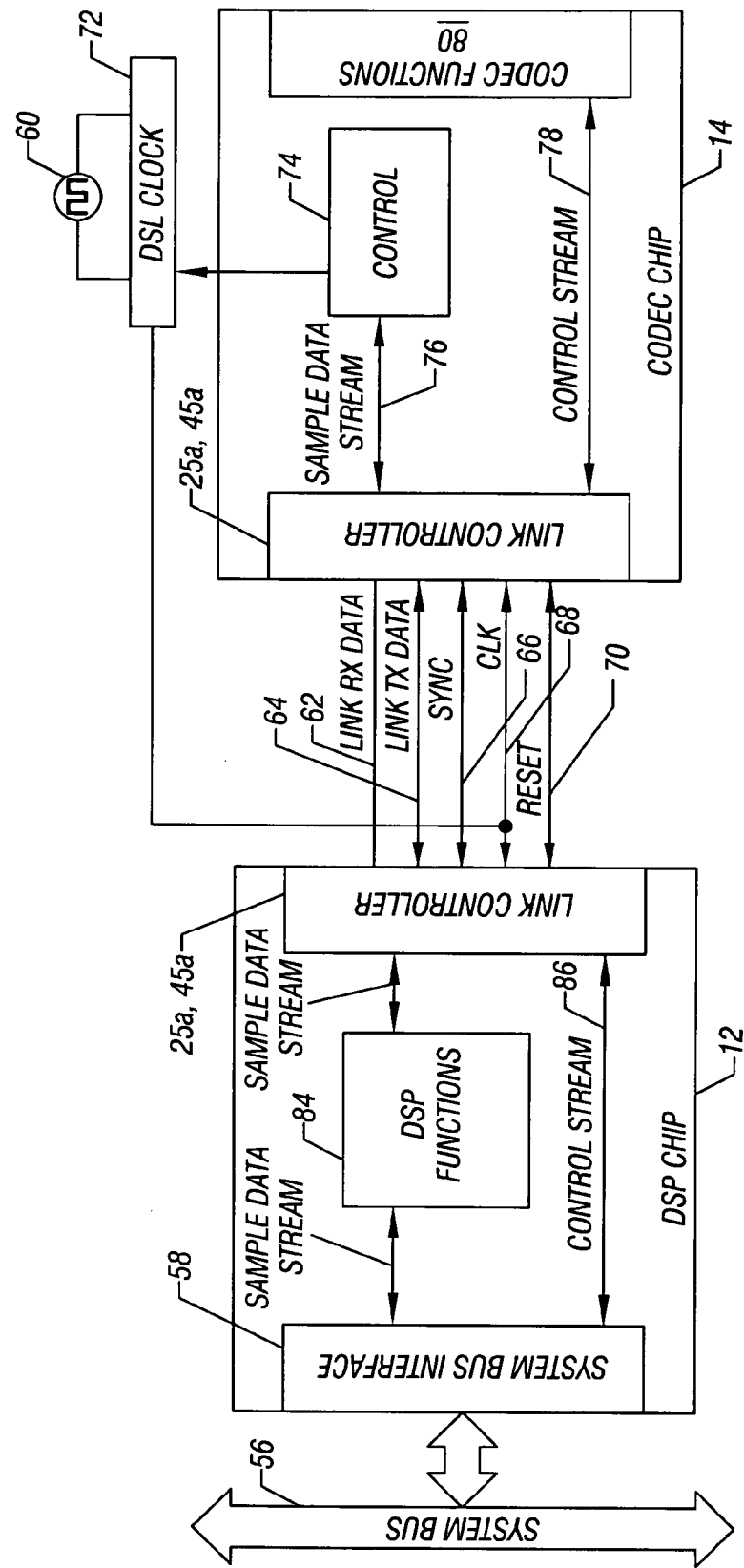
FIG. 2 is a block showing a digital signal processing (DSP) chip and a codec chip in accordance with one embodiment of the present invention.

Referring next to FIG. 2, in accordance with one embodiment of the present invention, a coder/decoder (codec) chip 14 may include a clock control interface 60 and a link controller 25a, 45a to the link 25. The link 25 may communicate with a link controller 25a on a DSP chip 12. A DSL clock 72 may be controlled by control 74 coupled to a control (out-of-band) data stream 76. A sample (in-band) data stream 78 may couple the link controller 25a, 45a to the codec functions 80. The DSL clock 72 may be implemented in the codec chip 14, DSP chip 12 or as a stand alone device, as shown in FIG. 2. With a stand alone device, the control signals for the clock function may come from software. However, a digital analog (D/A) converter is used for clock control. If the D/A converter is in the codec chip 14, the link may be used to carry the clock D/A sample data.

The DSP chip 12 may include a system interface 58 that interfaces with a system bus 56 in a processor-based system (not shown). A sample (in-band) data stream 82 may flow between the interface 58 and DSP functions 84 and on to the controller 25a, 45a. A control (out-of-band) data stream 86 may flow between the interface 58 and the controller 25a, 45a.

The signals on the links 25 and 45 include the data paths 62 and 64 which provide receive (data in) and transmit (data out) data at reduced data rates as described previously. In addition, control information in the form of a synchronization signal 66, clock information 68 and reset information 70 may also be provided in the multiplexed stream.

Figure 3:
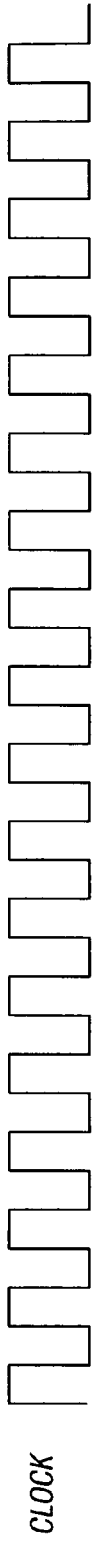
FIG. 3 shows an example of a clock signal that may be utilized in accordance with one embodiment of the present invention.
Figure 4:
FIG. 4 shows an example of a synchronization signal which may be utilized to synchronize data multiplexed between the codec and the DSP chips in one embodiment of the present invention.
Figure 5:
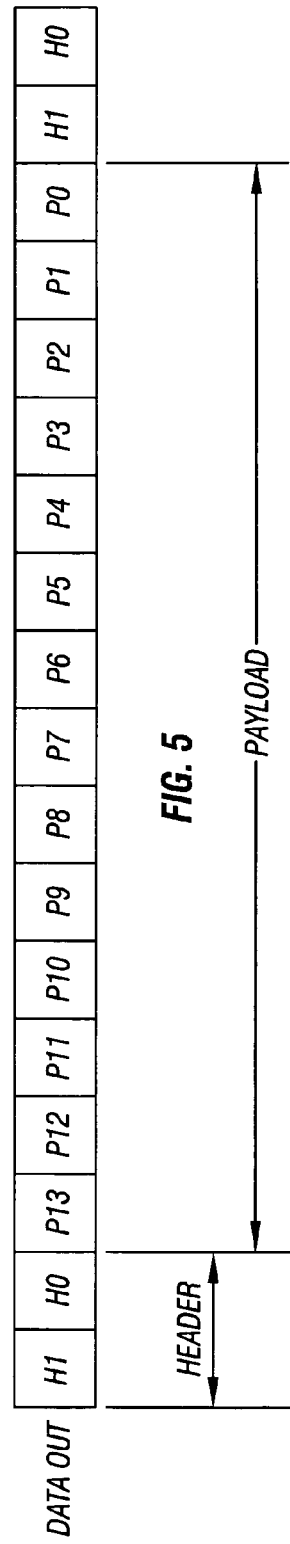
FIG. 5 is a timing diagram showing the data output from the DSP chip to the codec chip in one embodiment of the present invention.
Figure 6:
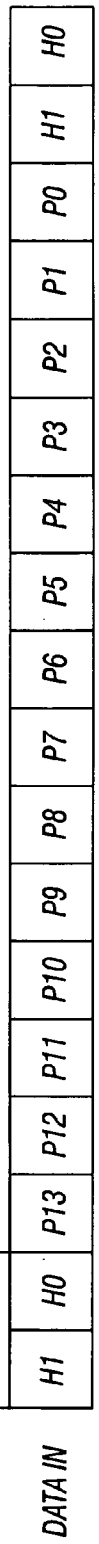
FIG. 6 is a timing diagram showing the data input from the codec chip to the DSP chip in one embodiment of the present invention.

Thus, the links 25, 45 may provide a serial interface which carries the data in and data out signals 62 and 64, a clock signal 68, a synchronization signal 70 and a reset signal 70. Examples of hypothetical data in and data out signals are shown in FIGS. 5 and 6, respectively. A hypothetical synchronization signal is illustrated in FIG. 4, and a hypothetical clock signal as illustrated in FIG. 3.

In the case of a soft modem embodiment, the DSP 12, shown in FIG. 2, may be eliminated. However, the links 25a, 25b, 45a, 45b and the interface 58 may still be used in some embodiments.

Thus, full duplex data flow may be achieved. The data frame may include a header that indicates the validity of the entire frame and also the validity of each cell within the frame. A header may also be needed to distinguish sample data from control data on the link. One instantiation of the frame uses a two bit header and a fourteen bit payload, as shown in FIGS. 5 and 6. A common clock and synchronization pulse may be utilized for both data intended for downstream and upstream communications. In one embodiment of the present invention, the system may implement a so-called g.lite ADSL modem. However, other ADSL modems may be implemented as well including splitterless modems and modems including splitters.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An asymmetric digital subscriber loop modem comprising:
    an integrated circuit;
    an analog-to-digital converter contained in said integrated circuit, said converter producing data at a relatively higher data rate;
    a device contained in said integrated circuit and coupled to said analog-to-digital converter, said device reducing the higher data rate data from the analog-to-digital converter to a lower data rate data;

a multiplexer to multiplex said lower data rate data and control information and transmit said data and control information externally of said integrated circuit; and a second integrated circuit, said second integrated circuit including a de-multiplexer to de-multiplex said lower data rate data and said control information.

2. The modem of claim 1 wherein said device includes a decimation filter.

3. The method of claim 2 wherein said integrated circuit includes an analog filter coupled to said analog-to-digital converter in turn coupled to said decimation filter in turn coupled to said multiplexer.

4. The modem of claim 1 wherein said integrated circuit further includes a demultiplexer coupled to a device that increases the data rate of data received by said demultiplexer, said device that increases the data rate being coupled to a digital-to-analog converter.

5. The modem of claim 4 wherein said device for increasing the data rate includes an interpolation filter.

6. The modem of claim 1 wherein said integrated circuit includes both a receiver section and a transmitter section.

7. The modem of claim 1 wherein said second integrated circuit implements discrete multi-tone modulation.

8. The modem of claim 7 wherein said second integrated circuit provides digital signal processing.

9. The modem of claim 7 wherein said second integrated circuit includes a fast Fourier transformer and a line decoder.

10. An asymmetric digital subscriber loop modem comprising:
    an integrated circuit;
    an analog-to-digital converter contained in said integrated circuit, said converter producing data at a relatively higher data rate;
    a device contained in said circuit and coupled to said analog-to-digital converter, said device reducing the higher data rate data from the analog-to-digital converter to a lower data rate;
    a multiplexer to multiplex said lower data rate data and control information and transmit said data and control information externally of said integrated circuit; and
    a second integrated circuit, said second integrated circuit including a line encoder to produce data at a relatively higher data rate and a device coupled to said line encoder to produce data at a relatively lower data rate, said device being coupled to a serializer which transmits said data to said integrated circuit.

11. The modem of claim 10 wherein said device is an inverse fast Fourier transformer.

12. A method comprising:
    receiving analog data on a first integrated circuit device within a modem;
    converting said analog data to digital format;
    decreasing the data rate of said data;
    serializing said data;
    multiplexing said serialized data with control information;
    transmitting said data to a second integrated circuit device within the modem; and
    demultiplexing said data and control information within said second integrated circuit device.

13. The method of claim 12 wherein reducing the data rate of said digital data includes decimating said digital data.

14. The method of claim 12 further including receiving said data on said second integrated circuit and de-serializing said data.

15. The method of claim 14 including increasing the data rate of said data on said second integrated circuit.

16. The method of claim 15 wherein increasing said data rate includes fast fourier transforming said data.

17. The method of claim 12 further including receiving digital data for transmission by said first chip and increasing the data rate of said data.

18. The method of claim 17 wherein increasing said data rate includes interpolating said data.

19. The method of claim 18 including converting said interpolated data to an analog format signal.

20. An asymmetric digital subscriber loop modem comprising:
    a first integrated circuit including an analog-to-digital converter, a device to reduce the data rate from the analog-to-digital converter to a lower data rate, and a serializer to multiplex said lower data rate data with control information; and
    a second integrated circuit, said serializer to transmit said lower data rate data from said first integrated circuit to said second integrated circuit, said second integrated circuit including a de-serializer to receive said lower data rate data from said first integrated circuit and demultiplex said lower data rate data and said control information before transmitting said data to a device for demodulating said data.

21. The modem of claim 20 wherein said second integrated circuit includes a modulating circuit which decreases the data rate of digital data and a serializer which transmits said decreased data rate data to said first integrated circuit, said first integrated circuit including a de-serializer that receives said modulated data, said de-serializer coupled to a device that increases the data rate of said data, said device coupled to a digital-to-analog converter.

22. The modem of claim 21 wherein said device that increases the data rate on said first integrated circuit is an interpolation filter.

23. The modem of claim 21 wherein said modulating circuit includes an inverse fast Fourier transformer.

24. The modem of claim 20 wherein said device on said first integrated circuit for decreasing the data rate of said data is a decimation filter.

25. The modem of claim 20 wherein said modem is a splitterless remote modem.

26. The modem of claim 20 wherein lower data rate data is transmitted in two directions between said first and second integrated circuits.

* * * * *